United States Patent
Gizurarson

(10) Patent No.: US 12,539,313 B2
(45) Date of Patent: Feb. 3, 2026

(54) MICROBIAL REMOVAL

(71) Applicant: CAPRETTO EHF., Grenivik (IS)

(72) Inventor: Sveinbjorn Gizurarson, Reykjavik (IS)

(73) Assignee: CAPRETTO EHF., Grenivik (IS)

( * ) Notice: Subject to any disclaimer, the term of this patent is extended or adjusted under 35 U.S.C. 154(b) by 964 days.

(21) Appl. No.: 17/435,826

(22) PCT Filed: Mar. 3, 2020

(86) PCT No.: PCT/IS2020/050007
§ 371 (c)(1),
(2) Date: Sep. 2, 2021

(87) PCT Pub. No.: WO2020/178865
PCT Pub. Date: Sep. 10, 2020

(65) Prior Publication Data
US 2022/0152092 A1    May 19, 2022

(30) Foreign Application Priority Data
Mar. 4, 2019 (IS) .......................................... 050256

(51) Int. Cl.
| | | |
|---|---|---|
| A61K 31/76 | (2006.01) | |
| A61K 9/00 | (2006.01) | |
| A61K 31/23 | (2006.01) | |
| A61K 31/765 | (2006.01) | |
| A61K 45/06 | (2006.01) | |
| A61K 47/10 | (2017.01) | |
| A61K 47/26 | (2006.01) | |
| A61L 2/232 | (2006.01) | |
| A61P 17/02 | (2006.01) | |
| A61P 31/10 | (2006.01) | |
| A61L 101/46 | (2006.01) | |

(52) U.S. Cl.
CPC .......... *A61K 31/765* (2013.01); *A61K 9/0043* (2013.01); *A61K 9/0046* (2013.01); *A61K 31/23* (2013.01); *A61K 45/06* (2013.01); *A61K 47/10* (2013.01); *A61K 47/26* (2013.01); *A61L 2/232* (2013.01); *A61P 17/02* (2018.01); *A61P 31/10* (2018.01); *A61L 2101/46* (2020.08); *A61L 2202/21* (2013.01)

(58) Field of Classification Search
CPC .................................................... A61K 31/765
See application file for complete search history.

(56) References Cited

U.S. PATENT DOCUMENTS

| | | |
|---|---|---|
| 4,411,932 A | 10/1983 | Kwan |
| 2002/0173029 A1 | 11/2002 | Scott |
| 2013/0090274 A1* | 4/2013 | Crossen ............... C10M 111/04 508/176 |

FOREIGN PATENT DOCUMENTS

| | | |
|---|---|---|
| WO | 2008012107 A2 | 1/2008 |
| WO | 2013142374 A1 | 9/2013 |
| WO | 2017221275 A1 | 12/2017 |
| WO | 2017221276 A1 | 12/2017 |

OTHER PUBLICATIONS

International Search Report and Written Opinion dated Jul. 1, 2020 for corresponding International Application No. PCT/IS2020/050007.
Chirife, J., et al. (1983). "In vitro antibacterial activity of concentrated polyethylene glycol 400 solutions.", Antimicrobial Agents and Chemotherapy, vol. 24(3), pp. 409-412. doi:10.1128/aac.24.3.409.
Ambrose, Ursula et al. (1991). "In vitro studies of water activity and bacterial growth inhibition of sucrose-polyethylene glycol 400-hydrogen peroxide and xylose-polyethylene glycol 400-hydrogen peroxide pastes used to treat infected wounds." Antimicrobial agents and chemotherapy, vol. 35(9), pp. 1799-1803.
Chvapil, M., et al. (1991). "Inert wound dressing is not desirable." Journal of Surgical Research, vol. 51(3), pp. 245-252. doi:10.1016/0022-4804(91)90102-r.
Icelandic Search Report dated Jul. 1, 2019 for corresponding Iceland Patent Application No. 050256.
Sutton, T.C., et al. (2010) "The effect of grafted methoxypoly(ethylene glycol) chain length on the inhibition of respiratory syncytial virus (RSV) infection and proliferation." Biomaterials, vol. 31(14), pp. 4223-4230.
Klemm, P. et al., (2000) "Bacterial adhesins: function and structure." International journal of medical microbiology : IJMM vol. 290(1), pp. 27-35—doi:10.1016/S1438-4221(00)80102-2.
Leo, J. C., et al. (2011). "Adhesins of Human Pathogens from the Genus *Yersinia*.", Bacterial Adhesion, Advances in experimental medicine and biology, vol. 715, pp. 1-15. doi:10.1007/978-94-007-0940-9_1.

(Continued)

*Primary Examiner* — Shawquia Jackson
(74) *Attorney, Agent, or Firm* — Tarolli, Sundheim, Covell & Tummino LLP

(57) ABSTRACT

Methoxy polyethylene glycol for use as a medicament, in particular in skin healing, wound healing and treatment of a microbial infection. A method for treating a medical device and/or implant to reduce or eliminate microbial contamination comprises applying a liquid formulation comprising methoxy polyethylene glycol. This invention relates to the novel discovery that methoxy polyethylene glycol, an inactive polymer with no known pharmacological effect, was able to come between microbes and a surface, removing the microbes or releasing the attachment or adherence of the microbes to the surface and thereby improving wound healing significantly, eliminating infections and colonies of microbes.

20 Claims, 2 Drawing Sheets

(56) References Cited

OTHER PUBLICATIONS

Hook, A. L., et al. (2012). "Combinatorial discovery of polymers resistant to bacterial attachment." Nature Biotechnology, vol. 30(9), pp. 868-875. doi:10.1038/nbt.2316.

* cited by examiner

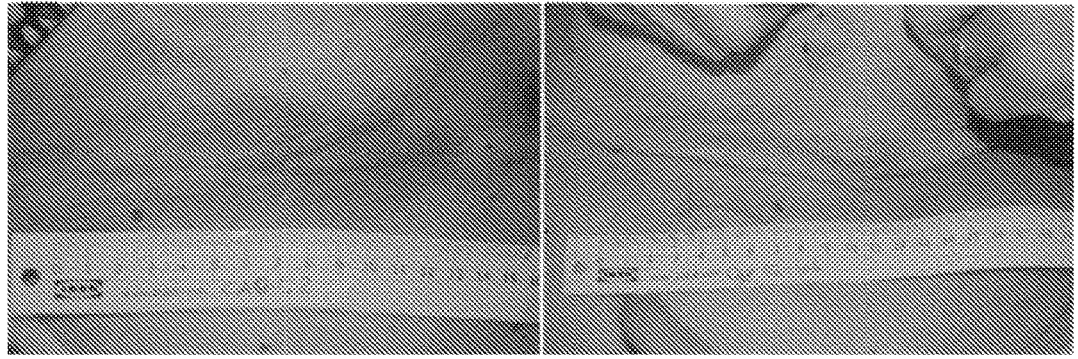
Figure 1A: Intertrigio, showing infection in the skin.
Figure 1B: After one week, the skin had Healed.
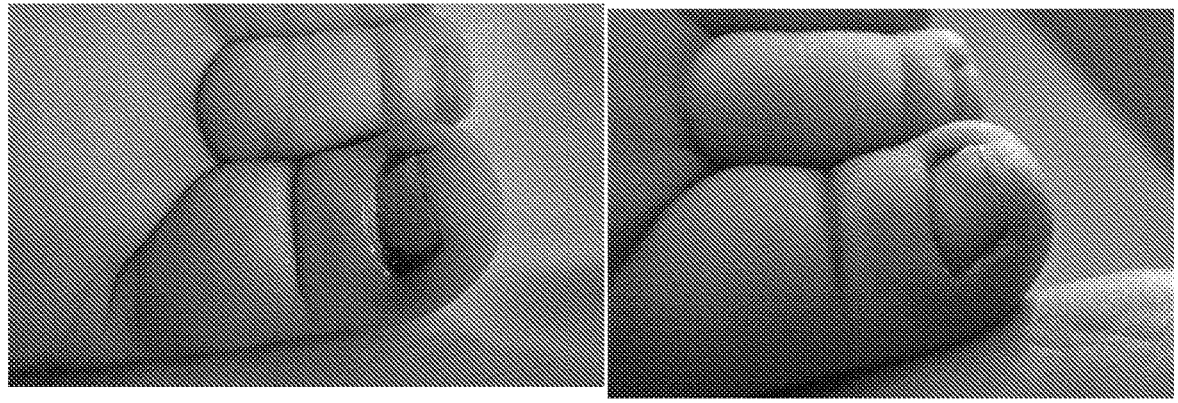
Figure 2A: Infection around toe nails
Figure 2B: One week after, using the invention, significant healing had occurred

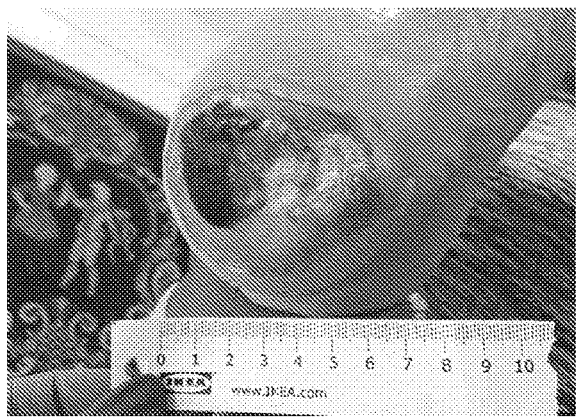

Figure 3A: Severe wound, that had not healed for months after attempts to use antibiotics or antifungal treatments

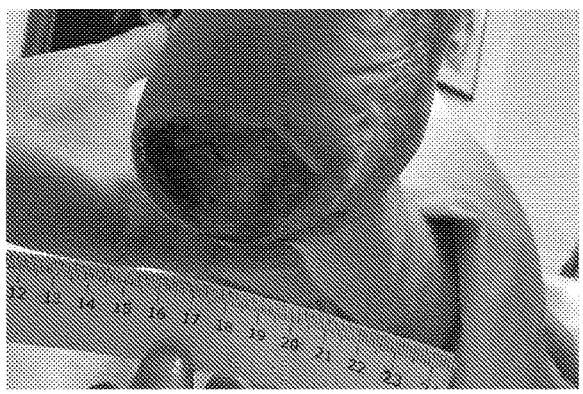

Figure 3B: Significant improvement only one week later, using the invention.

Figure 4A: Severe wound, that had not healed for months after attempts to use antibiotics or antifungal treatments

Figure 4B: Significant improvement only one week later, using the invention.

MICROBIAL REMOVAL

RELATED APPLICATIONS

The present application is a U.S. National Stage application under 35 USC 371 of PCT Application Serial No. PCT/IS2020/050007, filed on 3 Mar. 2020; which claims priority from IS Patent Application No. 050256, filed 4 Mar. 2019, the entirety of both of which are incorporated herein by reference.

FIELD

This invention relates to the novel pharmaceutical use of a compound for the microbicidal removal from surfaces, allowing treatment or prevention of infection, wound healing and improval of health.

INTRODUCTION

Microbial adhesion or attachment is the prerequisite for colonization of pathogenic bacteria, causing infections to mucosal surfaces as well as to wounds or skin infections. Among microbes, bacteria are most studied, since they are typically found attached or adhered to a surface (skin, mucosa or wound). This adhesion can be described as an anchor, allowing the microbe to tolerate various forces that may remove it from the surface such as mucosal and saliva flow during chewing and swallowing in the oral cavity (Klemm P and Schembri M A. Bacterial adhesins: function and structure. Int. J. Med. Microbiol. 290 (1): 27-35, 2000). Numerous mechanisms have been studied, describing the mechanism of adhesion of pathogenic bacteria, viruses, fungi or parasite. Here, different species have different solutions to attach to the surface of choice. That could be certain part of the skin, a wound, respiratory mucosa, oral mucosa, gastro-intestinal mucosa or other surfaces. *Yersinia enterocolitica* is one of these pathogenic bacteria that has been studied. It uses 3 molecules to attach to distal ileum, where it colonizes and induces its infection, these are called adhesins such as invasin, YadA and Ail, where invasin is required for enteric infection since it binds to $\beta 1$ integrins on microfold cells in the distal ileum (Leo J C and Skurnik M, Adhesins of human pathogens from the genus *Yersinia*. In Bacterial Adhesion, Linke D and Goldman A (Eds), Springer pp. 1-15). When the microbes adhere to surfaces such as non-biological surface, it is called a biofilm (Hook et al. Combinatorial discovery of polymers resistant to bacterial attachment. *Nature Biotechnology*, 30, 868-875, 2012.)

SUMMARY OF THE INVENTION

This invention is based on inventors' finding of a surprising and substantial effect, where compounds that have in the prior art been used as non-active excipients, and that are unable to kill microbes such as bacteria, viruses, fungi or parasites, have been found to make a thin film on a treated surface such as skin or a wound, resulting in the release or removal of the microbes from the surface, allowing the infected mucosa or infected skin or wound to be healed. The invention relates in particular to the use of these compounds hitherto used as excipients to remove infection or microbial attachment to the nasal, ocular, otal, pharynx, larynx, sinuses, oral cavity, gingual, buccal, vaginal, urether, male sexual organ, dermal surface or wound of a mammal by virus, pathogenic bacteria, fungi or parasite.

According to the present invention, methoxy polyethylene glycol which is preferably suitably formulated within the range 0.01-99.5%, more preferably in the range 0.2-98% and even more preferably in the range 0.5-95% has surprising effects on infected mucosal, dermal surfaces or wounds, removing microbes allowing the mucosa to be healed.

Accordingly, in one aspect the invention provides methoxy polyethylene glycol for use as medicament, such as in particular for for the treatment or prevention of microbial infection, by microbial removal.

In another aspect the invention provides methoxy polyethylene glycol for use in skin and/or wound healing, and/or for use in the treatment of a microbial infection, in particular infection of exposed skin or mucosa (e.g., intertrigo), or an infected wound.

A formulation of the invention containing methoxy polyethylene glycol has surprisingly powerful microbicidal effects by removing the attachment of the microbes from the surface, allowing the wound, infected skin or infected mucosal surface to heal. The methoxy polyethylene glycol can be used but is not limited for treating or preventing infections in the nasal, ocular, otal, pharynx, larynx, sinuses, oral cavity, gingual, buccal, vaginal, male sexual organ, various dermal surfaces or wounds of a mammal, caused by virus, pathogenic bacteria, fungi or parasite.

The particular formulation or composition (in the present context, these terms are synonymous) preferably comprises the methoxy polyethylene glycol in a concentration within the range 0.01-99.5%, preferably in the range 0.2-98% and more preferably in the range 0.5-95%. The formulations had surprising effects on infected mucosal and dermal surfaces, removing the microbes allowing the mucosa to be healed. In one embodiment of the invention a formulation comprises the mentioned methoxy polyethylene glycol compound together with antimicrobial compounds, provides that the microbes are removed from the infected surface by the methoxy polyethylene glycol and killed by the antimicrobial compounds. The infected surfaces are generally any of various mammalian surface such as the nasal, ocular, otal, pharynx, larynx, sinuses, gingual, buccal, oral cavity, rectum, vaginal, male sexual organs, various dermal surfaces or wounds, of a human or other mammal.

A further aspect of the invention relates to a method for preventing or treating infections caused by virus, bacteria, fungi or parasite on the skin, in skin or at mucosal membranes, in particular infection in the nasal, ocular, otal, pharynx, sinuses, gingual, buccal, and vaginal mucosa or the oral cavity, male sexual organ, different dermal surfaces or wounds, comprising administering an effective amount of the formulation which contains methoxy polyethylene glycol as an active ingredient.

Alternatively, according to the invention and due to its bioadhesive characteristics, the methoxy polyethylene glycol is able to induce a thin film covering the surface of the microbe in such a way that it cannot absorb necessary nutricians resulting in death of the microbe.

BRIEF DESCRIPTION OF FIGURES

FIG. 1A: Intertrigio, showing infection in the skin.
FIG. 1B: Same patient and view as in FIG. 1A, after one week of treatment, showing skin has healed.
FIG. 2A: Infection around tone nails.
FIG. 2B: Same patient as in FIG. 2A, one week later, after using the invention, healing has occurred.
FIG. 3A: Severe wound, that had not healed for months after attempts to use antibiotics or antifungal treatments.

FIG. 3B: Patient from FIG. 3A, significant improvement only one week later, using the invention.

FIG. 4A: Severe wound that had not healed for months after attempts of use antibiotics or antifungal treatments.

FIG. 4B: Same patient as in FIG. 4A, Significant improvement only one week later, using the invention.

DETAILED DESCRIPTION OF THE INVENTION

The term "microbial removal" is used herein to designate the action of a compound that is able to spread out as a thin bioadhesive film destroying or reducing the attachment of microbes to a biological surface, that includes dermal surface, surface of a wound and various mucosal surfaces.

The term "surface" is used herein to describe different mucosal and dermal areas such as but not limited to the skin such as the lips, area around nails, the skin on poorly ventilated regions such as under the breast, under the belly, between the buttocks, external ear, male sexual organ, rectum, between the toes and fingers etc. and mucosal areas such as but not limited to nasal mucosa, sinus mucosa (maxillary sinus, ethmoidal sinus and the sphenoidal sinus), vaginal mucosa, rectal mucosa, oral mucosa, buccal mucosa, gingual, pharynx, larynx as well as the eye, the channel from the nose to the eye called nasolacrimal channel and the channel from the nose to the ear called eustachian tube. The surface may be intact or diseased such as a wound.

Methoxy polyethylene glycol can in general be described by the formula I: $CH_3—(O—CH_2—CH_2)_n—OH$, wherein n is an integer that in general can range from 1 to 50, from 1 to 40, from 1 to 30, from 1 to 20 or from 1 to 10.

The methoxy polyethylene glycol is in accordance with the invention capable in removing and thereby alternatively killing viruses and/or bacteria and/or fungi and/or parasites. Killing of a microbe means that the virus, bacteria, fungi or parasite will be covered with a thin film of the bioadhesive material according to the invention making them unable to reach out for nutrients to survive and making them unable to attach or adhere to the surface according to the invention. In such a way a virus, upon effective exposure to the methoxy polyethylene glycol, will be unable to infect cells, i.e. the virus will be unable to introduce its genetic material into a cell wherein the genetic material can be reproduced. In the case of a bacterium, fungi or a parasite, upon effective exposure to the methoxy polyethylene glycol, is no longer capable of performing the basic functions of life; particularly, the bacterium, fungi or the parasite will no longer be able to obtain the necessary nutrition in order to maintain the physical integrity of the cell. As is seen from the claims and explanations given herein, it is contemplated, and considered justified to assume, that the methoxy polyethylene glycol is able to eliminate and terminate microbes from surfaces of a mammal such as but not limited to humans.

The formulation of the invention is generally a liquid or a semi-liquid formulation. The presently preferred formulation comprises a solution, emulsion, suspension, viscous fluid, semisolid such as but not limited to a gel or gel-like composition, in particular a hydrogel, or suppository or vagitory, that can be applied to and remain in contact with as surface as defined herein, such as in particular the nasal, ocular, otal, pharynx, larynx, sinuses, oral cavity, buccal, gingual, rectal, vaginal, male sexual organ or dermal surface of a mammal. For many mucosal surfaces, an aqueous solution is useful.

The liquid formulation can be in a form selected from the group consisting of solution, ointment, spray, aerosol, mist, drops, creme, gel, suppository, vagitory, sublingual lozenge, troche, pharynx drops, ear drops, sinus drops, nasal spray.

The aqueous solution in the formulation is preferably provided by having water as a constituent, normally a major constituent, of the formulation, but it is contemplated that the aqueous solution may also in certain cases be provided by various excipients such as but not limited to solubilizers, additional bioadhesive agents and surfactants.

In some embodiments, the formulations do not contain additional active agents. Alternatively, the formulation can comprise one or more antimicrobial lipid and/or one or more antiviral agent, one or more antibiotic agent, or one or more antifungal agent.

Ethanol (ethyl alcohol) may be added to the formulation, for example in case it contains antimicrobial lipids or glycerides. The pharmaceutical composition may additionally comprise a biologically active lipid selected from the group consisting of but not limited to glycerol monocaprate, glycerol monocaprylate, glycerol monolaurate, propylene glycol monocaprate, propylene glycol monocaprylate, glycerol dicaprin, glycerol dicaprylate, glycerol dilaurate, glycerol tricaprin, glycerol tricaprylate, glycerol trilaurate, octylglycerol, monomyristin, monopalmitolein, monoolein, propylene glycol monolaurate, coca butter, and combinations thereof. Unless otherwise specified in the text, all weight percents are weight/weight percentages based on the total weight of a "ready to use" or "as used" composition.

The formulation according to the invention contain the methoxy polyethylene glycol within the range 0.01-99.5%, preferably in the range 0.2-98% and more preferably in the range 0.5-95%. The selected concentration may depend on the intended delivery form (solution, spray, gel, etc.) and intended location of application or the surface, as further described herein. In some embodiments the methoxy polyethylene glycol is present in a concentration in the range of about 1-50% or the range of about 20-99%, or preferably the range of about 3-45% or the range of about 20-95%. In some embodiments the polyethylene glycol is present in a concentration in the range from about 0.1% or from about 0.2% or from about 0.5%, or from 1% or from about 2% or from about 3% or from about 4% or from about 5% or from about 8% or from about 10% or from about 12.5% or from about 15% or from about 20% or from about 25%, to about 50%, or to about 48%, or to about 45% or to about 40%, or to about 35%, or to about 30%, or to about 25%. In some embodiments the polyethylene glycol is present in a concentration in the range from about 25%, or from about 30%, or from about 32%, or from about 35%, or from about 40%, or from about 45%, or from about 50%, to about 99%, or to about 98%, or to about 96%, or to about 95%, or to about 92%, or to about 90%, or to about 85%, or to about 80%, or to about 75%, or to about 70%, or to about 65%, or to about 60%.

In some embodiments the the polyethylene glycol is present in a concentration in the range from about 0.01% or from about 0.02% or from about 0.05%, or from 0.1% or from about 0.2% or from about 0.3% or from about 0.4% or from about 0.5% or from about 0.8% or from about 1% or from about 1.1% or from about 1.2% or from about 1.5% or from about 2%, or from about 2.5% or from about 3%, to about 10%, or to about 9%, or to about 8% or to about 7%, or to about 6%, or to about 5%, or to about 4%.

The methoxy polyethylene glycol in a formulation according to the present invention are suitably used to encapsulate, coat or removal of the attachment to a surface one or more of the following viruses selected from but not limited to herpes virus type 1 and herpes virus type 2

(HSV-2), HIV, respiratory syncytial virus (RSV), influenza A virus and parainfluenza virus type 2, Adenoviruses, Coronavirus, Rhinovirus, Enterovirus, Human metapneumovirus, Varicella zoster virus, Zika virus; also the following bacteria selected from but not limited to *Staphylococcus aureus, Staphylococcus epidermis*, Streptococci A, Streptococci *pyogenes, Haemophilus influenzae, Streptococcus* D, *Streptococcus mutans, Streptococcus pneumoniae*, Corynebacteria sp. Nococardia asteroides, *Micrococcus* sp. *Pseudomonas aeruginosa, Listeria monocytogenes, Lactobacillus jensenii, Chlamydia trachomatis, Neisseria gonorrhoeae, Helicobacter pylori, Campylobacter jejuni, Mycobacterium tuberculosis, Moraxella catarrhalis, Veillonella parvula, Klebsiella species, Bordetella pertussis, Bordetella bronchiseptica, Corynebacterium diphtheria, Bacillus anthracis*; following fungi selected from but not limited to *Candida albicans, C. albicans, C. tripicalis, C. parapsilosis, C. glabrata, C. parakrusei, C. guillermondi, C. dubliniensis, Trichophyton rubrum, Malassezia*; and following prions selected from but not limited to "mad cow" disease, following parasites selected from but not limited to granulomatous amoebic encephalitis, acenthamoeba keratitis, babesiosis, balantidiasis, blastocystosis, cryptosporidiosis, cyclosporiasis, dientamoebiasis, amoebiasis, giardiasis, isosporiasis, leishmaniasis, malaria, rhinosporidiosis, *Naegleria fowleri*, sarcocystosis, toxoplasmosis, trichomoniasis, sleeping sickness, Chagas disease, tapeworm, hymenolepiasis, bertielliasis, sparganosis, schistosomiasis (bilharzia), clonorchiasis, fasciolosis, fluke, angiostrongyliasis, anisakiasis, roundworm, filariasis, dioctophyme renalis, dracunculiasis, gnathostomiasis, halicephalobiasis, river blindness, thelaziasis, toxocariasis.

As has already been pointed out the methoxy polyethylene glycol is in certain embodiments, depending on the intended use and application site or surface, present in an effective amount within a total volume of less than 100 mL, preferably less than 10 mL, more preferably les than 3000 μL, for certain surfaces the total volume of less than 1000 μL are preferable, or more preferably within the range 25-300 μL. Accordingly, the formulation of the invention is in some embodiments provided in a dosage unit providing a unit dose within the above mentioned ranges and amounts.

The pharmaceutical preparation of the invention comprises the pharmaceutically acceptable excipients which in this context, according to the invention, surprisingly is able to remove and/or kill microbes where such methoxy polyethylene glycol (mPEG) could be but is not limited to mPEG 350, mPEG 400, mPEG 550, mPEG 2000, mPEG 5000, mPEG 10,000 or mPEGs having molecular weight ranging from 200 to 10,000, appropriate for each delivery route or site, preferably in a concentration within a range from about 0.1%, such as from about 1%, such as from about 3%, to a concentration of about 99%, such as to about 95%, such as to about 90%, such as to about 80%, such as to about 75%, such as to about 70%, such as to about 60%, such as to about 50%, such as to about 40%, such as to about 20%, such as to about 15%, such as to about 10%, such as to about 5%, such as to about 4%, or to about 3%, or to about 2%. For example, the concentration of the mPEG can be as high as but is not limited to about 1%, about 1.5%, about 2%, about 2.5%, about 3%, or about 3.5%.

In some embodiments, the pharmaceutical preparation does not contain additional active ingredients in addition to the mPEG. In some embodiments, the pharmaceutical preparation does not contain additional active ingredients having antimicrobial activity in addition to mPEG, such as for example antibiotics.

In some embodiments the pharmaceutical preparation additionally comprises minor proportions of one or more substance(s) selected from the group consisting of absorption promoters, water absorbing polymers, microspheres, oils, emulsions, liposomes, substances that inhibit enzymatic degradation, alcohols, organic solvents, water, surfactants, hydrophobic agents, pH-controlling agents, preservatives and osmotic pressure controlling agents, cyclodextrines and propellants or mixtures thereof. A minor proportion as used herein typically refers to a concentration of less than 2% such as less than 1% such as less than 0.5%, such as less than 0.1%.

Methoxypolyethylene glycol as used herein refers generally to polyethylene glycol polymers, with a terminal methyl group. The term can be abbreviated as mPEG. As shown in Formula (I), the methoxypolyethylene glycol substance used in the present invention has polymer chain length with n being an integer in the range from 1 to 50 or 1 to 25, such as within a range from about 2, or from about 3, or from about 4, to about 50, about 25, such as to about 22, or to about 20, or to about 15, or to about 12, or to about 10. The mPEG may have a relatively uniform polymer length or a distribution of chains of different polymer length, within the given range. In some embodiments the distribution has a preferred average molecular weight, such as about 350, about 450, about 550 or about 650, corresponding to n being the average of about 7.2, about 9.5, about 11.7, and about 14, respectively. In one embodiment a combination product used in the formulation containing one or more substance(s) represented in the formula I is methoxypolyethylene glycol 350 (mPEG 350, such as Carbovax™ (DOW Chemical Company) and in another embodiment a combination used is the methoxypolyethylene glycol 550 (mPEG 550, e.g. Carbovax™). The numbers 350 and 550 refer respectively to average molecular weight of the respective substance.

Especially preferred for use in vehicle compositions according to the invention is Carbovax™ Sentry™ (mPEG 350 and mPEG 550) which refers to commercially available solvents of polymers of the above formula I, wherein n is mainly x and y, respectively, manufactured by The Dow Chemical Company mPEG 350 and mPEG 550 are colourless liquid miscible with water, alcohols, such as methanol, ethanol, n-proypanol, glycerol and various oils in all proportions and has a b.p. about 155° C. Both mPEG 350 and mPEG 550 are reported to be non-irritating when used in compositions for parenteral administration undiluted form as stated by Dow Chemicals.

The methoxypolyethylene glycols used in accordance with the present invention may e.g. be methoxy-diethyleneglyol (m2EG), methoxy-triethylene glycol (m3EG), methoxy-tetraethylene glycol (m4EG), methoxy-pentaethylene glycol (mSEG), methoxy-hexaethylene glycol (m6EG), methoxy-heptaethylene glycol (m7EG), methoxy-octaethylene glycol (m8EG), methoxy-nonaethylene glycol (m9EG), methoxy-decaethylene glycol (m10EG), methoxy-undecaethylene glycol (m11EG), methoxy-dodecaethylene glycol (m12EG), methoxy-tridecaethylene glycol (m13EG) and methoxy-tetradecaethylene glycol (m14EG). The ethylene glycols may be used in the form of the single compounds or a mixture of two or more methoxy-n-ethylene glycols, e.g. commercial products such as Carbovax™ Sentry™ (mPEG 350 or mPEG 550).

Methoxypolyethylene glycols are available in various qualities. Especially preferred are highly purified qualities such as Carbovax™ Sentry™ mPEG350 from The Dow Chemical Company.

Preferably, the polymers are methoxy-polyethyleneglycol (mPEG) and/or polyethylene glycols (PEG), having an average molecular weight ranging from 200 to 7500 or propylene glycol (PG) or mixtures thereof or single ethylene glycols such as tetraethylene glycol (4EG) and pentaethylene glycol (5EG).

According to a preferred aspect of the invention such as but not limited to vaginal or rectal delivery, the composition comprises less than 99% (w/w) of polyethylene glycol having an average molecular weight ranging from 200 to 7500.

The invention also relates to a method for applying to surfaces of animals such as pets: for example, but not limited to dogs, cats, rabbits, guinea pigs, farm animals: such as but not limited to horses, sheep, pigs, cattle, chicken or captured wild animals with an effective amount of the methoxy polyethylene glycol is applied to a surface of the animal to be treated with a formulation according to the invention. The volume administered to each animal, administration site, should preferably be calculated based on the relative human/animal surface area that need to be exposed.

The invention also relates to a method for treating implant outsides or medical device outsides (i.e., outer or exposed surfaces of implants or medical devices) that may become contaminated with microbes such as bacteria, virus, fungi, parasite or prions that should be eliminated prior to insertion of the device or implant, by applying a liquid formulation comprising methoxy polyethylene glycol, such as a formulation as described herein, to an outer or exposed surface of an implant or medical device. Thus, the method is suitable for but not limited to treating devices and implants such as a port-a-cath, pacemaker, ICD (implantable cardioverter defibrillator), dental implants, dentures, an intrauterine device (IUD), condoms, implants used for mending bone fractures (such as stell and titanium plate and screws) and the like. In some embodiments the methoxy polyethylene glycol is comprised in the formulation at a concentration in the range from about 0.1 to about 99%, or at a suitable concentration in a range mentioned herein. In some embodiments of the method the liquid formulation further comprises a physiologically acceptable vehicle and can in some embodiments optionally further comprise a further antimicrobial agent such as ethanol, antimicrobial lipid an/or an antiviral agent, an antibiotic agent, or an antifungal agent. In some embodiments of the method the formulation does not contain a further active ingredient (i.e. does not contain a further agent such as a further antimicrobial, antiviral, or antifungal agent).

The surface to which the pharmaceutical preparation of the invention is administered may be any mucosal membrane of the mammal to which may become colonized with microbes such as but not limited to the nose, sinuses, vagina, eye, ear, mouth, oral cavity, pharynx, genital tract, lungs, gastrointestinal tract, or rectum, preferably the mucosa of the nose, sinuses, ear, eye mouth (buccal, gingual, sublingual or to the hard palate), pharynx, larynx, vagina, uterus and the rectum air. The pharmaceutical preparation may also be administered to the skin, male sexual organ, between toes and fingers, around and on the nails.

The pharmaceutical compositions of the invention may be administered in the form of a sublingual lozenge or troche or a buccal, pharynx, ear, sinus or nasal spray or drops in the form of a solution, micells, nanoemulsion, optionally in water and/or together with polymers such as polyethylene glycol or propylene glycoloptionally in the form of slightly viscous solution or as a semi-solid or a gel or in the form of a suppository or vagitory.

In some embodiments the formulation of the invention additionally comprises polyoxyethylene-glyceride. As used herein it refers to a glyceride which is a mono- or diglyceride, i.e. with one or two fatty acid moieties connected to the glycerol backbone, and one or two polyoxyethylene glycol groups connected to one or both of the remaining one or two sites on the glycerol backbone of the glyceride. One type of such compound could be the compound called Softigen 767 from Cremer GmbH (Germany) or caprylocaproyl macrogol-8 glycerides, a mixture of mono-, di- and triglycerides and mono and di-fatty acid exters of polyethylene glycol such as Labrasol from Gattefosse (France).

If desired, the pharmaceutical compositions of the present invention can optionally include additional compounds to enhance the solubility of the therapeutic agent. Examples of such compounds, include: alcohols and polyols, such as isopropanol, butanol, benzyl alcohol, ethylene glycol, propylene glycol, butanediols and isomers thereof, glycerol, pentaerythritol, sorbitol, mannitol, transcutol, dimethyl isosorbide, polyethylene glycol, polypropylene glycol, polyvinylalcohol, hydroxypropyl methylcellulose and other cellulose derivatives, cyclodextrins and cyclodextrin derivatives; ethers of polyethylene glycols having an average molecular weight of about 200 to about 6000 or tetrahydrofurfuryl alcohol PEG ether (glycofurol, available commercially from BASF under the trade name Tetraglycol); amides, such as 2-pyrrolidone, 2-piperidone, .epsilon.-caprolactam, N-alkylpyrrolidone, N-hydroxyalkylpyrrolidone, N-alkylpiperidone, N-alkylcaprolactam, dimethylacetamide, and polyvinylpyrrolidone; esters, such as ethyl propionate, tributylcitrate, acetyl triethylcitrate, acetyl tributyl citrate, triethylcitrate, ethyl oleate, ethyl caprylate, ethyl butyrate, triacetin, propylene glycol monoacetate, propylene glycol diacetate, .epsilon.-caprolactone and isomers thereof, .delta.-valerolactone and isomers thereof, .beta.-butyrolactone and isomers thereof; and other solubilizers known in the art, such as dimethyl acetamide, dimethyl isosorbide (Arlasolve DMI (ICI)), N-methyl pyrrolidones (Pharmasolve (ISP)), monooctanoin, diethylene glycol monoethyl ether (available from Gattefosse under the trade name Transcutol), and water.

For the manufacturing of suppositories or vagitories or in case there is a need for additional fat, the formulation may additionally contain one or more substance from cocoa butter, high molecular weight polyethylene glycol, castor oil, paraffin oil, and adeps solidus.

Mixtures of solubilizers are also within the scope of the invention. Except as indicated, these compounds are readily available from standard commercial sources.

Preferred solubilizers include triacetin, triethylcitrate, ethyl oleate, ethyl caprylate, dimethylacetamide, N-methylpyrrolidone, N-hydroxyethylpyrrolidone, polyvinylpyrrolidone, hydroxypropyl methylcellulose, hydroxypropyl cyclodextrins, ethanol, methoxy-polyethylene glycol 350-1500, polyethylene glycol 200-1000, glycofurol, transcutol, propylene glycol, and dimethyl isosorbide. Particularly preferred solubilizers include sorbitol, glycerol, triacetin, ethyl alcohol, PEG-300-400, glycofurol and propylene glycol.

The amount of solubilizer that can be included in compositions of the present invention is not particularly limited. Of course, when such compositions are ultimately administered to a patient, the amount of a given solubilizer is limited to a bioacceptable amount, which is readily determined by one of skill in the art. In some circumstances, it may be advantageous to include amounts of solubilizers far in excess of bioacceptable amounts, for example, to maximize the concentration of therapeutic agent, with excess solubilizer removed prior to providing the composition to a patient using conventional techniques, such as distillation or evaporation. Typically, the solubilizer will be present in an amount of about 1% to about 100%, more typically about 5% to about 75% by weight or about 5% to about 25% by weight.

Other excipients that may be needed and/or useful in the formulation are the following: pH-controlling agents, such as, nitric acid, phosphoric acid, or acetic acid, citrate; preservatives and osmotic pressure controlling agents, such as glycerol, sodium chloride, methyl paraoxybenzoate, or benzoic acid; powder compositions, such as, alfa-, beta- and gamma-cyclodextrines, cellulose and derivatives; microspheres, nanospheres, virosomes, proteosomes, liposomes and emulsions compositions, such as starch, albumin, gelatine, or lecithins or lysoleciythins; microencapsulated formulations; propellants such as butane; water.

The formulation may also contain a spermicide such as but not limited to surfactants such as nonoxynol-9, chelating agents such as ethylenediaminetetraacetic acid (EDTA), channel-forming ionophores such as gramicidin, and other spermicidal agents such as benzalkonium chloride, sodium docusate and cholate acid and salts thereof.

Examples of infections that can be treated or prevented by the formulations and method according to the invention may be any infection of the skin or mucosa caused by bacteria, virus, parasite or fungi towards the methoxy polyethylene glycol, described herein, are effective. Mucosa or mucosal membranes or surfaces may be the oral, aural, nasal, lung, gastro-intestinal, vaginal or rectal mucosa (as well as the surroundings) and the skin may be intact skin, wound or skin which in some way have been injured. Examples of such fungi, bacteria and virus which can cause infection of the skin or mucosa are e.g. fungi such as e.g. Dermatophytes, Black *piedra, White piedra*, Tines nigra, and Tines *versicolor*; bacteria such as e.g. *Escherichia coli, Pseudomonas* aerginosa, and Staphylooccus *aureus*; virus such as e.g. influenza virus A, influenza virus B, influenza virus C, parainfluenza virus, mumps virus, Newcastle disease virus, viruses of rinderpest, canine distemper virus, respiratory syncytial virus, rabies virus, herpes simplex type 1, herpes simplex type 2, herpes genitalis, varicella zoster, cytomegalovirus, and Epstein-Barr virus.

It is also contemplated that the formulation according to the invention is useful for the prevention or treatment of infection by a retrovirus such as e.g. human immuno deficiency Virus (HIV), sarcoma viruses, leukemia viruses, and human lymphotropic viruses types 1 and 2, and/or for the prevention or treatment of acquired immune deficiency syndrome (AIDS).

Example 1

Formulations were made to be used as nasal, pharynx, larynx and sinus spray, ear drops, wound or skin infections to remove and thereby prevent further infections in the nose, pharynx, larynx, the sinuses, ear canals, external ear, wound or skin etc. according to the invention may contain following formulation:

| Component | Formulation I | Formulation II |
|---|---|---|
| Monocaprin | | 0.15% |
| Monolaurin | — | 0.35% |
| mPEG* | 97% | 96.5% |
| Ethanol | 3.0% | 3.0% |

*Methoxypolyethyelene glycol 350

As shown in FIGS. 1A, 2A, 3A and 4A show the infection prior to the use of Formulation I. After using the formulation for 1 week, surprisingly there was a significant wound healing as seen in FIGS. 1B, 2B, 3B and 4B. In all situations, the patients had attempted to use antibiotics or antifungal treatment over a long period without success.

The addition of monocaprin and monolaurin (Formulation II) showed in addition to significant wound healing and skin healing, the microbes were killed.

Example 2

Formulations were made to be used as nasal spray or ear drops to prevent and/or fight infections in the nose, the sinuses, ear canals, external ear etc. according to the invention may contain following formulation:

| Component | Formulation I | Formulation II |
|---|---|---|
| Monocaprin | | 0.1-0.5% |
| Monolaurin | | 0.1-0.5% |
| mPEG* | 2% | 2% |
| Propylene glycol | 4% | 4% |
| Labrasol or Softigen 767 | 10% | 10% |
| Ethanol | | 2% |
| Polysorbate 80 | 0.8% | 0.8% |
| Water | 83.2% | 80.2% |

*Methoxypolyethyelene glycol 350

The invention claimed is:

1. A method for treating a medical device and/or implant to reduce or eliminate microbicidal contamination of said device or implant, comprising applying to a surface of said device or implant a liquid formulation comprising methoxy polyethylene glycol, wherein said liquid formulation does not contain additional active microbicidal agents, antiviral agents, or antifungal agents.

2. The method according to claim 1, for treating a device or implant selected from a port-a-cath, pacemaker, implantable cardioverter defibrillator, a dental implant, dentures, an intrauterine device (IUD), a condom, and implants used for mending bone fractures including plates and screws from titanium or steel.

3. The method according to claim 1, wherein said liquid formulation comprises methoxy polyethylene glycol in a concentration in the range from about 0.1 to about 99%.

4. A method for: treating or preventing a microbial infection; skin healing; the removal or reduction of microbes from mucosa, skin, or a wound; and/or treating a skin wound, the method comprising topically administering methoxy polyethylene glycol as an active film-forming ingredient in a liquid, semi-liquid formulation, or formulation releasing liquid, wherein the methoxy polyethylene glycol forms a thin film covering a treated surface to make at least one microbe unable to adhere or attach to the treated surface.

5. The method according to claim 4, wherein said methoxy polyethylene glycol is formulated in a concentration in the range from about 0.1 to about 99% in said formulation, the formulation further comprising a physiologically acceptable vehicle.

6. The method according to claim 4, wherein the methoxy polyethylene glycol is represented by formula I:

$$CH_3-(O-CH_2-CH_2)_n-OH \qquad (I)$$

wherein n is an integer in the range from 1 to 50.

7. The method according to claim 4, wherein said formulation is a liquid formulation in a form selected from the group consisting of solution, ointment, spray, aerosol, mist, drops, creme, gel, suppository, vagitory, sublingual lozenge, troche, pharynx drops, ear drops, sinus drops, and nasal spray.

8. The method according to claim 5, wherein said liquid or semi-liquid formulation further comprising ethanol, antimicrobial lipid and/or an antiviral agent, an antibiotic agent, or antifungal agent.

9. The method according to claim 4, wherein the methoxy polyethylene glycol is used in a formulation that does not contain additional active agents.

10. The method according to claim 4, wherein said liquid or semi-liquid formulation further comprises an antimicrobially active lipid selected from the group consisting of glycerol monocaprate, glycerol monocaprylate, glycerol monolaurate, propylene glycol monocaprate, propylene glycol monocaprylate, propylene glycol monolaurate, glycerol dicaprin, glycerol dicaprylate, glycerol dilaurate, glycerol tricaprin, glycerol tricaprylate, glycerol trilaurate, octylglycerol, monomyristin, monopalmitolein, monoolein, propylene glycol monocaprylate, propylene glycol monolaurate, and any combination thereof.

11. The method according to claim 4, wherein the methoxy polyethylene glycol is formulated in a concentration in the range from about 0.1% to about 99%.

12. The method according to claim 4, wherein the methoxy polyethylene glycol is formulated in a concentration in the range from about 1% to about 95%.

13. The method according to claim 4, wherein the methoxy polyethylene glycol is formulated in a concentration in the range from about 3% to about 90%.

14. The method according to claim 4, wherein the methoxy polyethylene glycol is topically administered as an active ingredient for the treatment or prevention of microbial infection by a virus, pathogenic bacteria, fungi, or parasite.

15. The method according to claim 4, wherein the methoxy polyethylene glycol is topically administered as an active ingredient for the reduction or removal of microbial attachment to the nasal mucosa, ocular mucosa, oral mucosa, pharynx, larynx, sinuses, oral cavity, gingual surface, buccal mucosa, vaginal surfaces, rectal surfaces, urether surfaces, male sexual organ, dermal surface, or wound of a mammal.

16. A method, comprising:
topically administering methoxy polyethylene glycol as a medicament to a surface of a mammal to form a thin film on the surface for the treatment or prevention of microbial infection by a virus, pathogenic bacteria, fungi, or parasite, the methoxy polyethylene glycol being an active ingredient, wherein the thin film destroys or reduces the attachment of microbes by starving the microbes of nutrients.

17. The method according to claim 16, wherein said methoxy polyethylene glycol is formulated in a concentration in the range from about 0.1 to about 99%, in a liquid or semi-liquid formulation, the formulation further comprising a physiologically acceptable vehicle.

18. The method according to claim 17, wherein said liquid or semi-liquid formulation further comprising ethanol, antimicrobial lipid and/or an antiviral agent, an antibiotic agent, or antifungal agent.

19. The method according to claim 16, wherein the methoxy polyethylene glycol is used in a formulation that does not contain additional active agents.

20. The method according to claim 16, wherein the methoxy polyethylene glycol is formulated in a concentration in the range from about 0.1% to about 99%.

* * * * *